United States Patent
Reed, Jr. et al.

[11] Patent Number: 6,125,983
[45] Date of Patent: Oct. 3, 2000

[54] ELECTRIC PARKING SPRAG

[75] Inventors: Richard G. Reed, Jr., Royal Oak; Steven A. Barnhart, Rochester Hills, both of Mich.

[73] Assignee: Chrysler Corporation, Auburn Hills, Mich.

[21] Appl. No.: 08/982,213

[22] Filed: Dec. 1, 1997

[51] Int. Cl.[7] .............................. F16D 3/14; F16D 47/02; F16D 69/00
[52] U.S. Cl. ...................... 192/219.5; 192/219.4
[58] Field of Search .............................. 192/219.5, 219.4, 192/226; 188/31; 74/577 S, 473.12; 180/65.1

[56] References Cited

U.S. PATENT DOCUMENTS

| | | | |
|---|---|---|---|
| 2,248,564 | 7/1941 | Wood | 192/142 |
| 4,790,204 | 12/1988 | Tury et al. | 74/483 PB |
| 4,907,681 | 3/1990 | Kuusik et al. | 74/577 S |
| 5,696,679 | 12/1997 | Marshall et al. | 364/424.82 |
| 5,743,348 | 4/1998 | Coppola et al. | 180/65.6 |

Primary Examiner—Rodney H. Bonck
Assistant Examiner—Tisha D. Waddell
Attorney, Agent, or Firm—Jennifer M. Stec

[57] ABSTRACT

A parking sprag is provided for engaging a parking gear of an automotive transmission. The parking sprag includes a sprag mechanism pivotally mounted to a support structure. A linkage assembly operatively engages the sprag mechanism for pivoting the sprag mechanism into engagement with the parking gear. A linkage cam engaged with the linkage assembly and is driven by an electric motor. The electric motor drives the linkage cam which drives the linkage assembly in order to engage the sprag mechanism with the parking gear.

9 Claims, 4 Drawing Sheets

ELECTRIC PARKING SPRAG

BACKGROUND OF THE INVENTION

1. Field of the Invention

The present invention relates to a parking brake system for use with an automotive transmission and more particularly to an electrically operated parking sprag for operatively engaging a parking gear.

2. Background and Summary of the Invention

The members of the consuming public who have preferred automobiles with automatic transmissions have become accustomed to a standard shift lever system which includes a PRNDL shift arrangement. In this shift arrangement, when the shift lever is shifted to the "P" position, the automatic transmission is automatically shifted to a park condition. Recently, there has been research and development in the area of providing automated manual-type transmission systems. The automated manual transmission systems have the simplicity and convenience of automatic transmission while maintaining the higher efficiency of a manual transmission. However, it is typical that a manual transmission does not include a park feature. Instead, manual transmission vehicles are typically provided with a parking brake which is activated by the driver of the vehicle. Typically, parking brake systems for vehicles having a manual transmission provide a dual function as an emergency brake which frictionally engages the vehicle wheels to inhibit rotation. In addition, manual transmissions are often placed in gear by the operator after the vehicle engine is turned off in order to provide an effective brake for the vehicle in a parked condition.

However, in converting a manual transmission to an automated manual transmission, it is desirable to provide a shift lever which simulates that of a standard automatic transmission including a parking "P" position. Accordingly, the present invention provides an electrically operated parking sprag for engaging a parking gear mounted on an output shaft of a transmission which is responsive to a shift lever being moved to the park position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
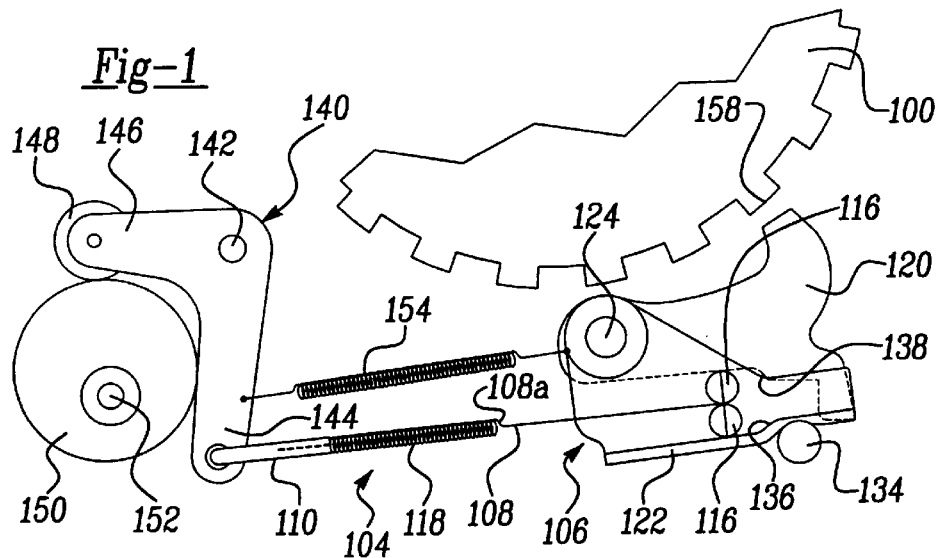
FIG. 1 is a detailed view of a parking sprag assembly in a disengaged position, according to the principles of the present invention.
Figure 2:
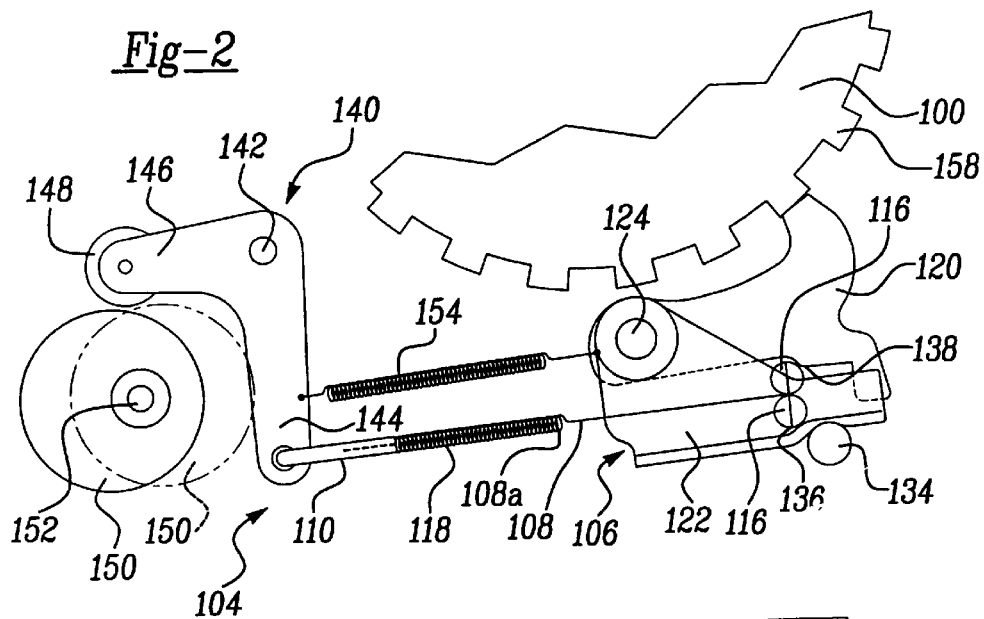
FIG. 2 is a detailed view similar to FIG. 1 with the parking sprag engaging a top portion of a tooth of a parking gear.
Figure 3:
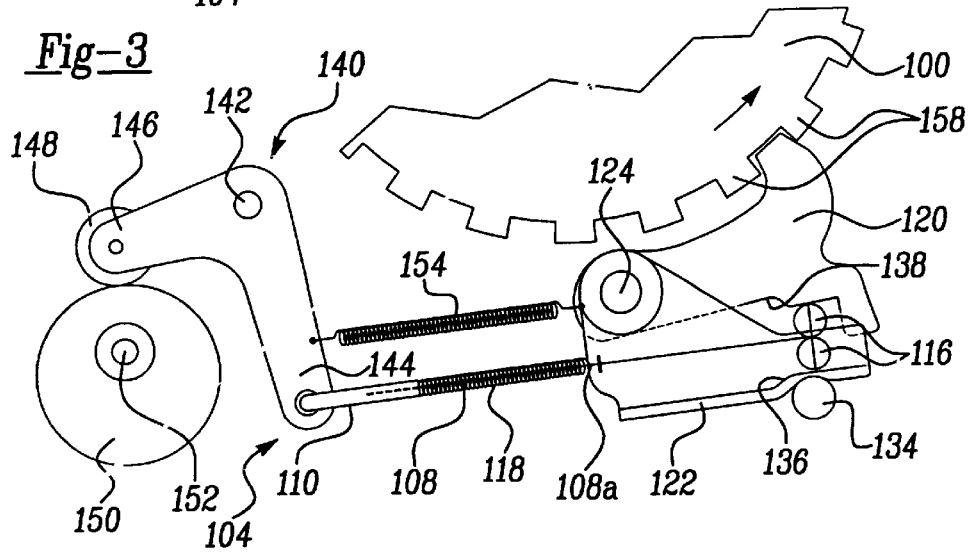
FIG. 3 is a detailed view similar to FIG. 1 with the parking sprag engaged with the parking gear.

With reference to FIGS. 1–3, the present invention provides a parking gear 100 mounted to an output shaft of a transmission (not shown). The parking gear 100 is selectively engaged by a parking sprag assembly 104.

Figure 4:
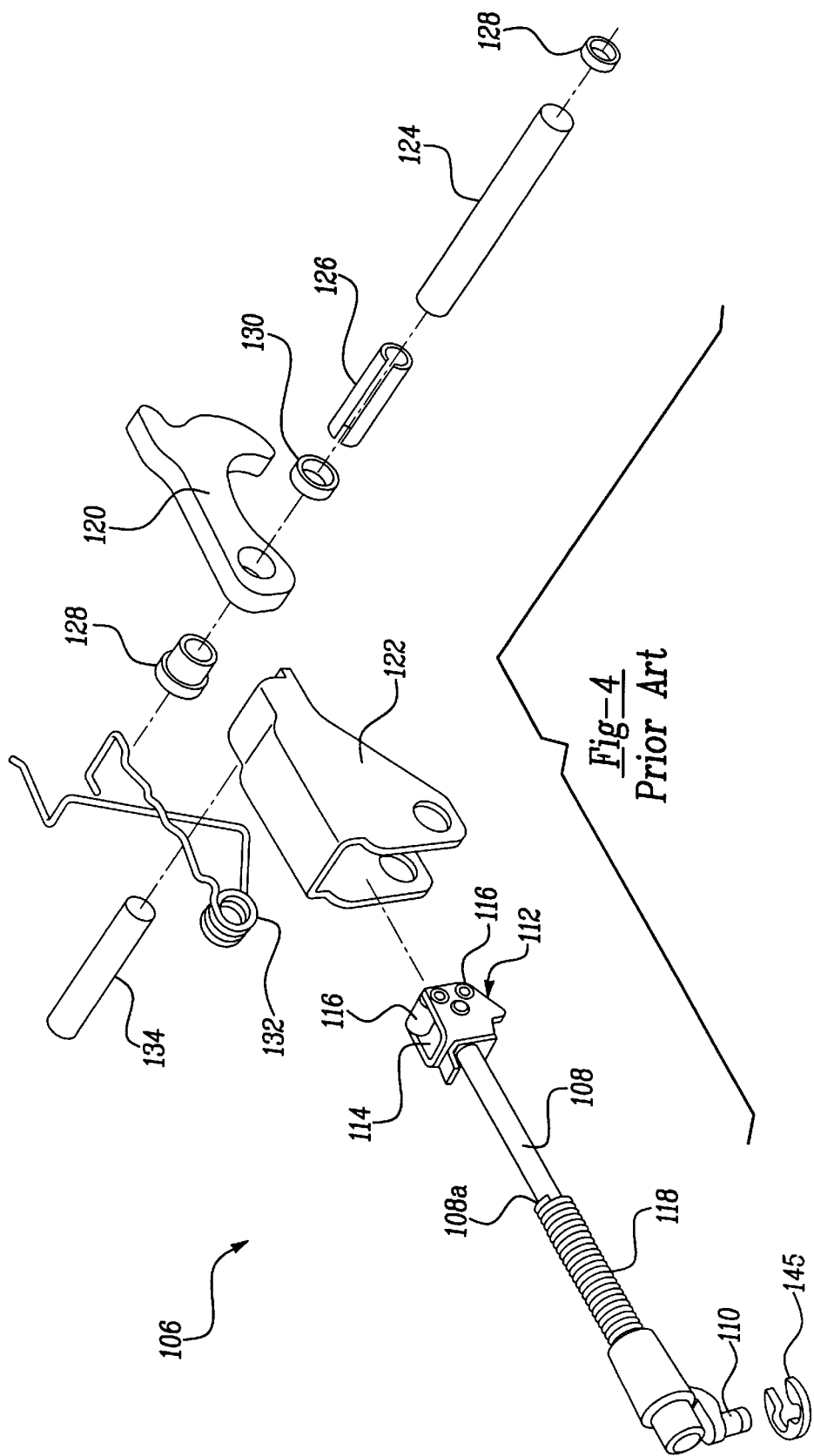
FIG. 4 is an exploded view of the sprag mechanism which is utilized with the present invention.

According to a preferred embodiment of the present invention, the parking sprag assembly 104 is operated electrically. The sprag mechanism 106, as shown in FIG. 4, is known in the prior art. The sprag mechanism 106 includes an activation rod 108 provided with a pivot 110 on one end for attachment to an actuation lever (not shown) and a cam roller assembly 112 is attached to an opposite end of activation rod 108 and includes a housing 114 which rotatably supports a pair of cam rollers 116. A pressure release spring 118 is provided between a detent portion 108a on activation rod 108 and pivot member 110.

A sprag member 120 is attached to a guide bracket 122 via a pivot pin 124. A sleeve 126 is provided on the pivot pin 124 and supports the sprag member 120 thereon. A pair of end fittings 128 and a bushing 130 are provided for maintaining the spacing of the sprag member 120 relative to the guide bracket 122. A return spring 132 is provided for biasing the sprag member 120 toward the guide bracket 122. A blocker pin 134 is provided for limiting movement of the guide bracket 122.

As best shown in FIGS. 1–3, the guide bracket 122 includes a cam surface 136 and sprag member 120 includes an opposing cam surface 138. The cam rollers 116 of cam roller assembly 112 are received between cam surfaces 136, 138 of guide bracket 122 and sprag member 120, respectively.

According to the present invention, the activation rod 108 is attached to an actuation lever 140 which is pivotably attached to a gear train housing via pivot pin 142. Lever 140 includes a first arm portion 144 attached to the activation rod 108 and secured thereto by a C-clip. Lever 140 includes a second arm portion 146 supporting a cam roller 148 at an end thereof. Cam roller 148 engages a linkage cam member 150 which is rotatably mounted about pivot point 152. A spring 154 is connected between the first arm portion 144 of lever 140 and guide bracket 122. Spring 154 biases lever 140 to rotate in a counter clockwise direction as shown in FIGS. 1–3 so as to maintain cam roller 148 in contact with cam 150. Spring 118 is weaker than spring 154 so that spring 118 does not prevent cam roller 148 from maintaining contact with cam 150.

During engagement of the parking sprag assembly, linkage cam 150 is rotated from the position shown in FIG. 1, wherein the parking sprag is in the disengaged position, to the position as shown in FIG. 2. As linkage cam 150 rotates, lever 140 pivots in a counter clockwise direction causing the cam rollers 116 of roller cam assembly 112 to engage cam surfaces 136, 138 of guide bracket 122 and sprag member 120, respectively. As roller cam assembly 112 is pressed into engagement with cam surfaces 136, 138, sprag member 120 is pressed against the biasing force of return spring 132 toward engagement with parking gear 100.

As shown in FIG. 2, the sprag member 120 may come in contact with a top portion of a tooth 158 of parking gear 100 and will not be allowed to engage the parking gear 100. During continued rotation of linkage cam 150 and corresponding rotation of lever 140, activation rod 108 will continue to place force against roller cam assembly 112 which is pressed against cam surfaces 136, 138 for separating sprag member 120 from guide member 122. The biasing force of spring 154 and pressure release spring 118 will build up as linkage cam 150 rotates while sprag member 120 abuts tooth 158 of parking gear 100. The spring force is such that any rotation of the vehicle wheels which causes rotation of the output shaft of the of transmission will cause parking gear 100 to rotate slightly, thereby allowing sprag member 120 to engage the teeth 158 of parking gear 100 and affirmatively lock the output shaft in a parked position as shown in FIG. 3.

Figure 5:
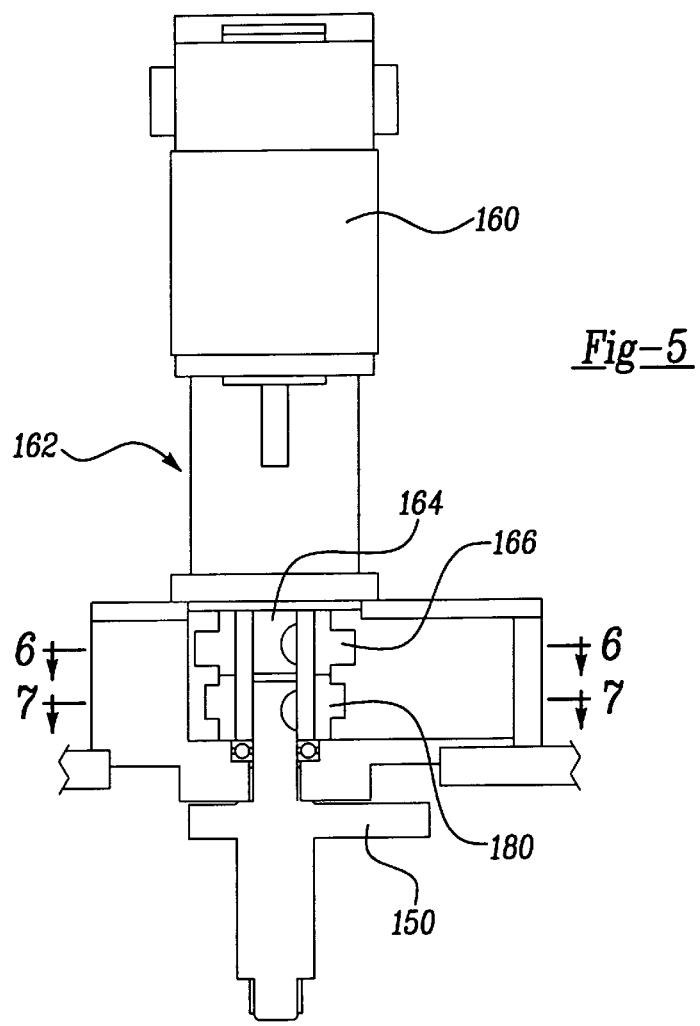
FIG. 5 illustrates the cam linkage drive assembly according to the principles of the present invention.
Figure 6:
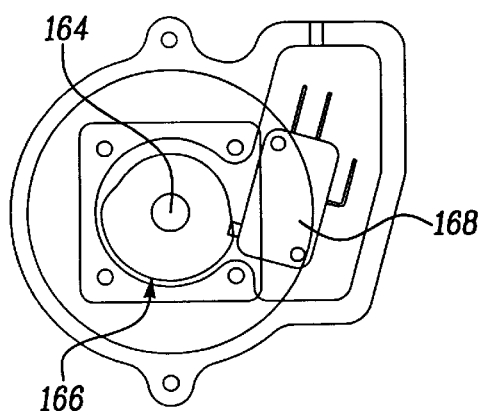
FIG. 6 is a cross-sectional view taken along line 6—6 of FIG. 5 illustrating the second cam and corresponding switch.
Figure 7:
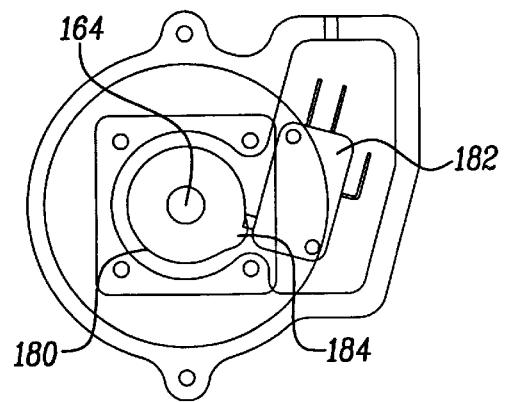
FIG. 7 is a cross-sectional view taken along line 7—7 of FIG. 5 illustrating the third cam and corresponding switch.
Figure 8:
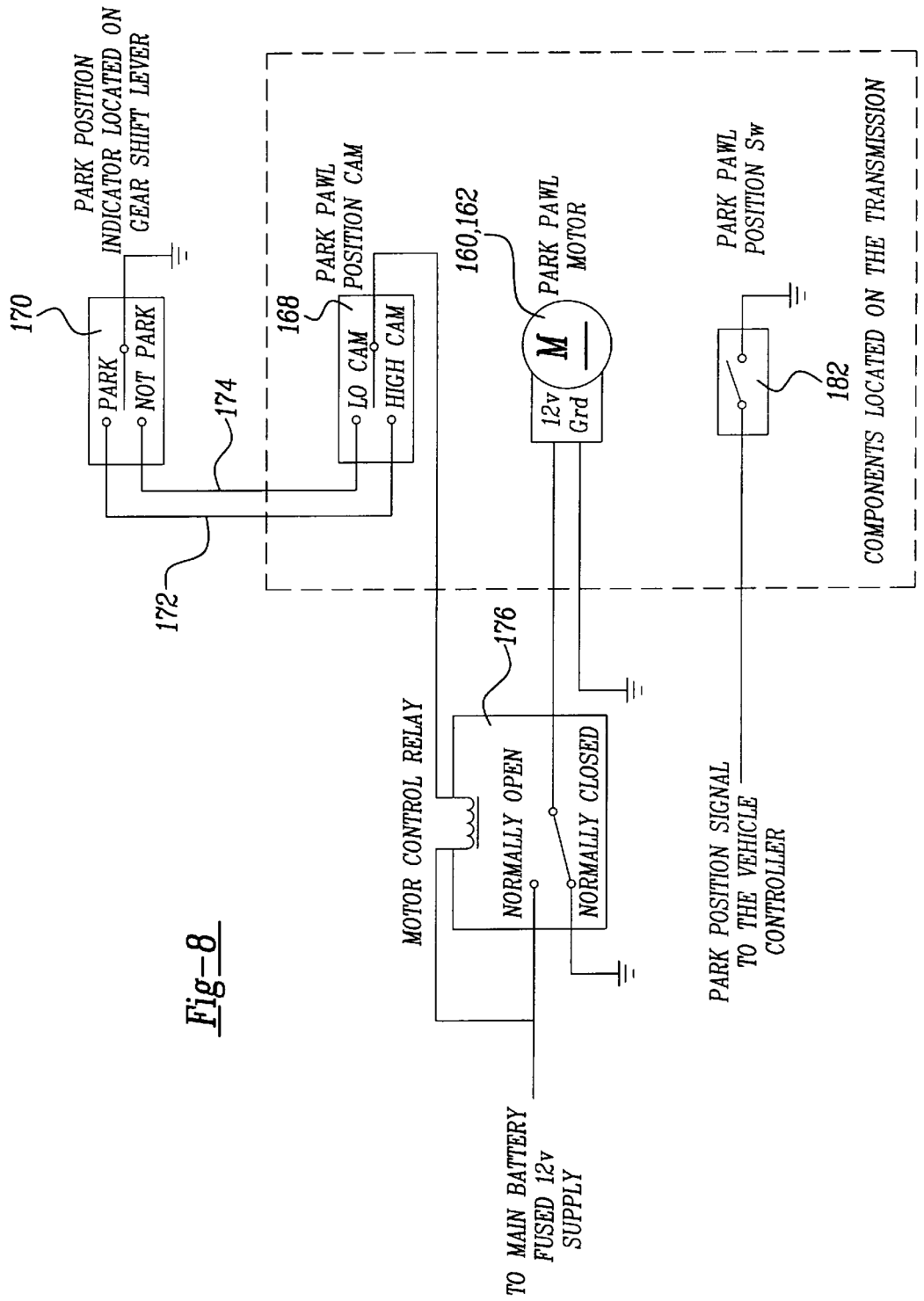
FIG. 8 illustrates the circuitry for controlling the electric parking sprag according to the principles of the present invention.

With reference to FIGS. 5–7, a motor 160 is provided for driving a speed reducer 162 which is connected to linkage cam 150 via a coupling shaft 164. A second cam 166 is installed on the coupling shaft 164 between the gear motor 160/162 and the linkage cam 150. The second cam 166 throws a single pole double throw (SPDT) micro switch 168. The second cam 166 is designed to close one pole of the switch 168 for the first 180 degrees of rotation and close the second pole for the next 180 degrees of rotation. FIG. 8 illustrates a control circuit that uses the switch 168 driven by the second cam 166 and a similar SPDT switch 170 mounted to the shifter lever in the passenger compartment. The shifter-mounted switch 170 is thrown when the shift lever is moved into the park position. This closes the first circuit 172. Power is then supplied to a relay 176 that drives the electric gear motor 160/162 until the second cam 166 throws switch 168, opening the first circuit 172. The rotation of the parking linkage cam 150 is then stopped and the sprag member 120 locks the parking gear 100.

When the shift lever is moved from park, the second circuit 174 is closed. Power is then supplied to the relay 176 that drives the electric gear motor 160/162 until the second cam 166 throws its switch 168, opening the second circuit 174. The rotation of the parking linkage cam 150 is then stopped and sprag member 120 unlocks the parking gear 100.

In order to prevent the gear motor inertia from carrying the cam a full 180 degrees past the required stopping point, the relay 176 is designed to short the motor 160 to ground when it is not being driven electrically. This effectively provides an electric braking action which is provided for stopping the gear motor 160/162 as required. In order to help a vehicle controller identify whether the parking gear is unlocked and prevent it from trying to launch the vehicle while still in park, a third cam 180 and switch 182 (shown in FIG. 7) are provided next to second cam 166. The third cam 180 has a lobe 184 which is aligned to indicate when the parking gear is unlocked.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A parking sprag for engaging a parking gear of an automotive transmission, comprising:

a sprag mechanism pivotally mounted to a support structure;

a linkage assembly operatively engaging said sprag mechanism for pivoting said sprag mechanism into engagement with the parking gear;

a linkage cam engaged with said linkage assembly; and an electric motor coupled to said linkage cam;

wherein said electric motor drives said linkage cam which drives said linkage assembly in order to engage said sprag mechanism with the parking gear.

2. The parking sprag according to claim 1, further comprising a switch associated with a shift lever for closing a circuit connected to said electric motor upon moving said shift lever to a predetermined position.

3. A parking sprag for engaging a parking gear of an automotive transmission, comprising:

a sprag mechanism pivotally mounted to a support structure;

a linkage assembly operatively engaging said sprag mechanism for pivoting said sprag mechanism into engagement with the parking gear;

a linkage cam engaged with said linkage assembly;

an electric motor coupled to said linkage cam;

a first switch associated with a shift lever for closing a circuit connected to said electric motor upon moving said shift lever to a predetermined position; and a second switch for opening said circuit when said electric motor rotates said linkage cam to a position corresponding to a parking sprag engaged position, wherein said electric motor drives said linkage cam which drives said linkage assembly in order to engage said sprag mechanism with the parking gear.

4. The parking sprag according to claim 3, wherein said second switch operatively engages a second cam which is coupled to said electric motor.

5. The parking sprag according to claim 3, further comprising a third switch for sending a park position signal to a vehicle controller when said linkage cam is in a position corresponding to a parking sprag engaged position.

6. The parking sprag according to claim 5, wherein said third switch operatively engages a second cam which is coupled to said electric motor.

7. The parking sprag according to claim 3, wherein said switch closes a second circuit when said shift lever is moved away from said predetermined position, said second circuit connecting a source of power to said electric motor.

8. The parking sprag according to claim 7, wherein said second switch opens said second circuit when said electric motor rotates said linkage cam to a position corresponding to a parking sprag disengaged position.

9. A parking sprag for engaging a parking gear of an automotive transmission, comprising:

a sprag mechanism pivotally mounted to a support structure;

a linkage assembly operatively engaging said sprag mechanism for pivoting said sprag mechanism into engagement with the parking gear, said linkage assembly having a pivot lever supporting a cam lever, said pivot lever being biased in a first direction in order to maintain said cam roller in engagement with said linkage cam, said pivot lever being further attached to an activation arm which engages said sprag mechanism;

a linkage cam engaged with said linkage assembly; and an electric motor coupled to said linkage cam;

wherein said electric motor drives said linkage cam which drives said linkage assembly in order to engage said sprag mechanism with the parking gear.

* * * * *